P. W. SHIEL.
BRAKE.
APPLICATION FILED MAR. 6, 1915.

1,237,108.

Patented Aug. 14, 1917.

Witnesses:

Inventor
P. W. Shiel.

Attorney

UNITED STATES PATENT OFFICE.

PETER W. SHIEL, OF ALBANY, NEW YORK.

BRAKE.

1,237,108.  Specification of Letters Patent.  Patented Aug. 14, 1917.

Application filed March 6, 1915. Serial No. 12,571.

*To all whom it may concern:*

Be it known that I, PETER W. SHIEL, a subject of the King of Great Britain, residing at Albany, in the county of Albany and State of New York, have invented certain new and useful Improvements in Brakes; and I do hereby declare the following to be a full, clear, and exact description of the invention, such as will enable others skilled in the art to which it appertains to make and use the same.

This invention relates to brakes, and more particularly to an emergency brake for use upon motor vehicles, which embodies shoes for movement beneath the drive wheels of the motor vehicle, forwardly thereof for supporting the drive wheels above the pavement or ground, and consequently preventing the forward movement of the vehicle.

An object of this invention is to provide a brake as specified, which embodies shoes for insertion beneath the drive wheels of a motor vehicle which curves upwardly, and are reinforced at their forward curved portions, and have upstanding sides for preventing the wheels from sliding sidewise off the shoes when they are moved beneath the wheels, and further to provide means for holding the shoes in an upper non-wheel supporting position.

A still further object of this invention is to provide means for limiting the movement of the shoes beneath the drive wheels of a motor vehicle.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 3:
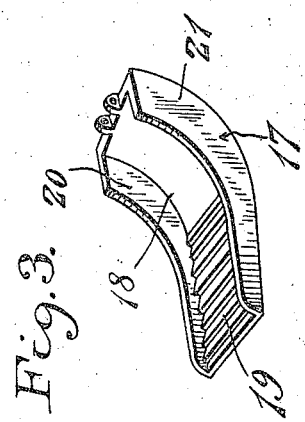
Figure 1:
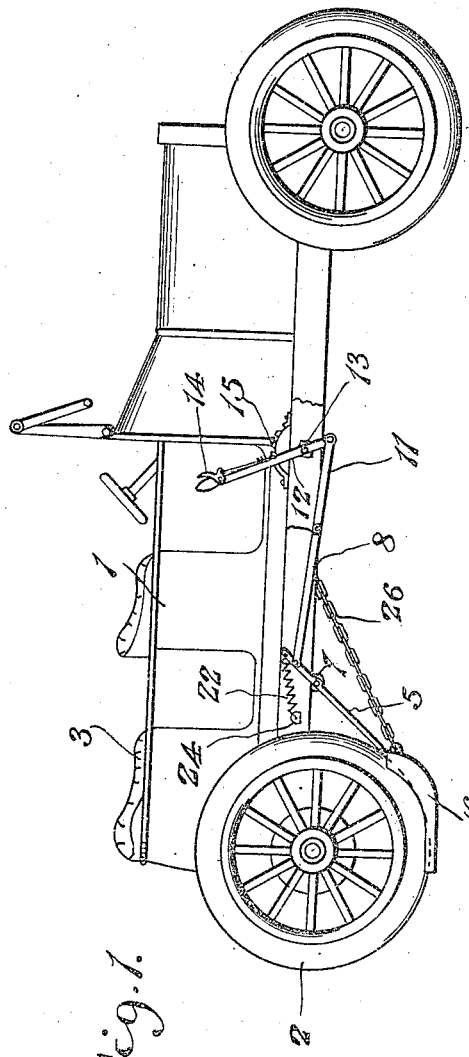
Figure 2:
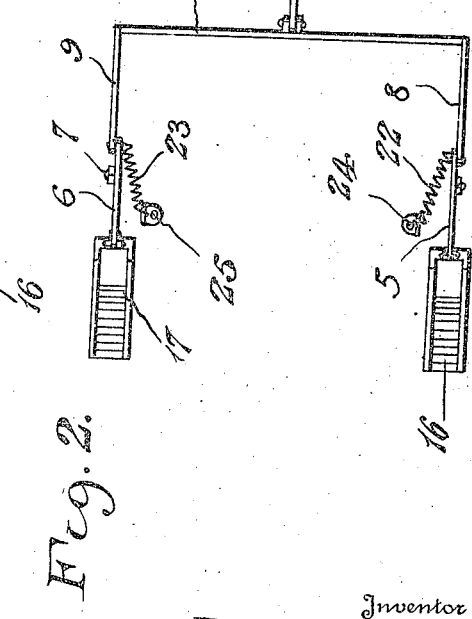

Figure 1 is a side elevation of the improved brake mechanism, showing the same applied to a motor vehicle, Fig. 2 is a top plan view of the improved brake mechanism, and Fig. 3 is a detail perspective view of one of the wheel supporting shoes.

Referring more particularly to the drawings, 1 designates an ordinary motor vehicle which has rear driving wheels 2 and a body 3. The body 3 has levers 5 and 6 pivotally connected thereto, as is shown at 7, which levers have their upper ends pivotally connected to rods 8 and 9, that extend forwardly from the levers 5 and are connected to a cross bar 10. The cross bar 10 has a link 11 secured thereto, which link has its forward end connected to a lever 12 below the fulcrum 13 of the lever. The lever 12 has the ordinary type of dog mechanism 14 carried thereby which coacts with a quadrant 15 for holding the levers in various adjusted positions, and it is bent upwardly above the floor of the motor vehicle to a position for convenient access thereto by the person driving the vehicle.

The levers 5 and 6 have their lower ends pivotally connected to shoes 16 and 17 which are positioned in alinement with the peripheries of the drive wheels 2, and are positioned forwardly of the wheels.

The shoes 16 and 17 have bottom plates 18, which have the rear sections of their upper surfaces corrugated, as is shown at 19, the corrugations extending rearwardly to the toes of the shoes. The forward ends of the shoes 16 and 17 curve upwardly, as is clearly shown in Fig. 3 of the drawings.

The bottom plates 18 of the shoes 16 and 17 have upstanding sides 20 and 21 secured to their side edges, for extension upwardly upon the sides of the tire of the drive wheels of the motor vehicle, for preventing lateral or sidewise movement of the wheels independent of the shoes.

The levers 5 and 6 have spiral springs 22 and 23 secured to their upper ends, which springs are also secured to brackets 24 and 25, which are carried by the vehicle body 1. The springs 22 and 23 are provided for holding the shoes 16 and 17 upwardly out of a wheel engaging position, except when the levers 5 and 6 are operated by pivotal movement of the lever 12, as will be hereinafter more fully described.

The shoes 16 and 17 have chains or flexible members 26 secured thereto which extend forwardly therefrom and are connected to the vehicle body 1, for limiting the rearward movement of the shoes and regulating the distance of insertion of the shoes beneath the power or drive wheels of the vehicle.

When it is desired to suddenly stop the motor vehicle to which the improved brake mechanism is applied, the lever 15 is moved forwardly, which rocks the levers 5 and 6, through their connection with the lever 12 by means of bars 8 and 9 and the rod 10. The rocking of the levers 5 and 6 force the shoes 16 and 17 rearwardly beneath the rear drive wheels 2 of the vehicle, causing the shoes to support the drive wheels above the ground, and consequently prevent forward movement of the vehicle, also allowing the wheels to rotate freely within the shoes, thereby eliminating the usual jar and wear upon an engine occasioned by the sudden applying of the emergency brake. The chains 26 will limit the rearward movement of the shoes. Immediately upon the rearward movement of the lever 12, or the release of the dog mechanism 14 carried thereby, the springs 22 will act for automatically moving the shoes upwardly into a non-wheel engaging position.

From the foregoing description taken in connection with the accompanying drawings the advantages of construction and of the method of operation of the improved brake will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

The combination with an automobile including a chassis and rear wheels, a substantially U-shaped member having its web portion journaled transversely to the chassis for disposing the arm portions upon each side of the chassis, levers pivoted to the chassis forward of the rear wheels, said levers having their upper ends pivoted to the ends of the arm portions of the said member, shoes pivoted to the lower end of the levers, springs connected to the upper ends of the levers and to the chassis at a joint rearward of the pivot of the levers and forward of the rear wheels for normally holding the shoes in an inoperative position, a link pivoted to the web portion of the member, an operating lever pivoted to the link and to the chassis for moving the shoes in engagement with the periphery of the wheels, and chains connected to the chassis forward of the pivot of the levers and to the shoes for limiting the rearward movement of the shoes.

In testimony whereof I affix my signature in presence of two witnesses.

PETER W. SHIEL.

Witnesses:
THOS. J. MCENANEY,
FREEMAN S. ARNOLD.